United States Patent
Kasher et al.

(10) Patent No.: US 9,893,786 B2
(45) Date of Patent: Feb. 13, 2018

(54) MULTI-LINK BEAMFORMING TRAINING TECHNIQUES FOR 60 GHZ WIRELESS NETWORKS

(71) Applicant: INTEL IP CORPORATION, Santa Clara, CA (US)

(72) Inventors: Assaf Kasher, Haifa (IL); Solomon Trainin, Haifa (IL); Alexander Maltsev, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 31 days.

(21) Appl. No.: 14/977,542

(22) Filed: Dec. 21, 2015

(65) Prior Publication Data

US 2017/0033850 A1  Feb. 2, 2017

Related U.S. Application Data

(60) Provisional application No. 62/200,023, filed on Aug. 1, 2015.

(51) Int. Cl.
| | |
|---|---|
| *H04B 7/02* | (2017.01) |
| *H04L 1/02* | (2006.01) |
| *H04B 7/06* | (2006.01) |
| *H04L 29/06* | (2006.01) |
| *H04B 7/0452* | (2017.01) |

(52) U.S. Cl.
CPC ......... *H04B 7/0617* (2013.01); *H04B 7/0452* (2013.01); *H04L 69/22* (2013.01)

(58) Field of Classification Search
CPC ..... H04L 1/0072; H04L 69/22; H04B 7/0617; H04B 7/0452
See application file for complete search history.

(56) References Cited

U.S. PATENT DOCUMENTS

| | | | |
|---|---|---|---|
| 8,830,917 B1* | 9/2014 | Zhang | H04W 4/00 370/329 |
| 2007/0127427 A1* | 6/2007 | Tanaka | H04W 48/16 370/338 |
| 2007/0230373 A1* | 10/2007 | Li | H04B 7/0447 370/267 |
| 2011/0149918 A1* | 6/2011 | Gong | H04W 72/005 370/336 |
| 2011/0150004 A1* | 6/2011 | Denteneer | H05L 5/0023 370/476 |
| 2012/0087358 A1* | 4/2012 | Zhu | H04W 72/042 370/338 |
| 2014/0003384 A1* | 1/2014 | Zhang | H04B 7/0413 370/329 |

* cited by examiner

Primary Examiner — Chieh M Fan
Assistant Examiner — Sung Ahn

(57) ABSTRACT

Various embodiments may be generally directed to multi-link beamforming training techniques for 60 GHz wireless networks. In some embodiments, a 60 GHz-capable device in a 60 GHz wireless network may train wireless links with multiple other 60 GHz-capable devices simultaneously. In various embodiments, the multiple wireless links may be trained simultaneously using a multi-link beamforming training packet that comprises a format designed for simultaneous training of multiple wireless links. Other embodiments are described and claimed.

21 Claims, 9 Drawing Sheets

200

220

MULTI-LINK BEAMFORMING TRAINING TECHNIQUES FOR 60 GHZ WIRELESS NETWORKS

RELATED CASE

This application claims priority to U.S. Provisional Patent Application No. 62/200,023, filed Aug. 1, 2015, the entirety of which is hereby incorporated by reference.

TECHNICAL FIELD

Embodiments described herein generally relate to wireless communications between devices in wireless networks.

BACKGROUND

The 60 GHz wireless communication frequency band offers substantial promise for use in accommodating the ever-growing data-rate demands of wireless communications devices and their users. The 60 GHz band contains a large amount of available bandwidth, the physical properties of signals with frequencies in the 60 GHz band render them well-suited for use in directional transmission and reception in conjunction with the application of spatial multiplexing techniques. A topic of interest with respect to 60 GHz wireless networks is the potential application of multiple-input multiple-output (MIMO) techniques, which may include multiple-user MIMO (MU-MIMO) techniques. A personal basic service set (PBSS) control point/access point (PCP/AP) in a 60 GHz wireless network that is configured with MU-MIMO capabilities may be able to realize improvements in data rate and efficiency by transmitting concurrently to multiple STAs. However, the implementation of MU-MIMO transmission may necessitate more accurate beamforming data and require the PCP/AP to engage in an increased amount of beamforming training, and thus may introduce significant additional overhead with respect to wireless channel resources and power.

DETAILED DESCRIPTION

Figure 1:
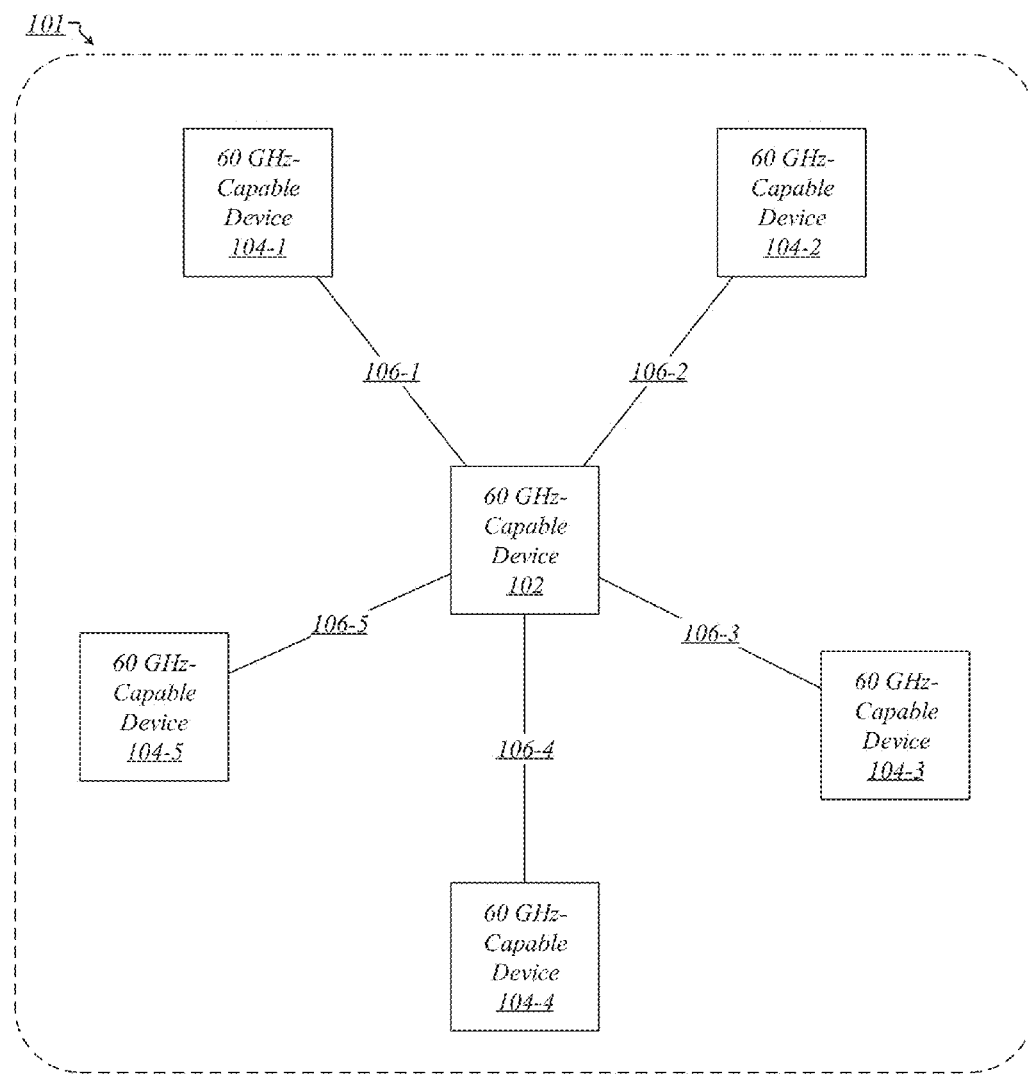
FIG. 1 illustrates an embodiment of a first operating environment.

Various embodiments may be generally directed to multi-link beamforming training techniques for 60 GHz wireless networks. In some embodiments, a 60 GHz-capable device in a 60 GHz wireless network may train wireless links with multiple other 60 GHz-capable devices simultaneously. In various embodiments, the multiple wireless links may be trained simultaneously using a multi-link beamforming training packet that comprises a format designed for simultaneous training of multiple wireless links. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards, such as the IEEE 802.11ay standard that is currently under development. Some embodiments may involve wireless communications performed according to one or more millimeter-wave (mmWave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 such as may be representative of various embodiments. In operating environment 100, a wireless network 101 comprises 60 GHz-capable devices 102, 104-1, 104-2, 104-3, 104-4, and 104-5. In some embodiments, wireless network 101 may comprise a wireless network that utilizes wireless channel frequencies of the 60 GHz band. In various embodiments, 60 GHz-capable devices within wireless network 101 may communicate with each other according to one or more standards for 60 GHz wireless communications. For example, in some embodiments, 60 GHz-capable devices within wireless network 101 may communicate with each other according to one or more protocols and/or procedures defined in IEEE 802.11ad-2012, and/or its predecessors, revisions, progeny, and/or variants. In various embodiments, 60 GHz-capable devices 102, 104-1, 104-2, 104-3, 104-4, and 104-5 may comprise 60 GHz-capable stations (STAs) such as Directional Multi-Gigabit (DMG) stations (STAs). In some embodiments, some or all of the 60 GHz-capable devices within wireless network 101 may communicate with each other according to one or more protocols and/or procedures that may be defined in the IEEE 802.11ay standard that is currently under development. The embodiments are not limited to these examples.

In operating environment 100, 60 GHz-capable device 102 may operate as a personal basic service set (PBSS) control point/access point (PCP/AP). When operating in this role, 60 GHz-capable device 102 may be capable of communicating with 60 GHz-capable devices 104-1, 104-2, 104-3, 104-4, and 104-5 via respective beamformed wireless links 106-1, 106-2, 106-3, 106-4, and 106-5. In order to optimize the qualities of each of these links, 60 GHz-capable device 102 may need to engage in beamforming training with each of 60 GHz-capable devices 104-1, 104-2, 104-3, 104-4, and 104-5. In conjunction with training its respective links with each of 60 GHz-capable devices 104-1, 104-2, 104-3, 104-4, and 104-5, 60 GHz-capable device 102 may need to transmit training fields to each of 60 GHz-capable devices 104-1, 104-2, 104-3, 104-4, and 104-5.

In order to realize higher data rates and/or to make more efficient use of allocated spectrum resources, it may be desirable that 60 GHz-capable device 102 be configured to perform MU-MIMO transmission, according to which it may transmit to multiple 60 GHz-capable devices—and thus over multiple beamformed wireless links—simultaneously. However, the implementation of MU-MIMO transmission may require that 60 GHz-capable device 102 train beamformed wireless links 106-1, 106-2, 106-3, 106-4, and 106-5 more frequently, more precisely, or both. As a result, there may be a cost associated with the implementation of MU-MIMO, both in terms of wireless channel resources and in terms of power.

In order to reduce the wireless channel resource and/or power costs associated with the use of MU-MIMO, 60 GHz-capable device 102 may be configured to train multiple wireless links simultaneously. In various embodiments, 60 GHz-capable device 102 may be configured to train multiple wireless links simultaneously using a multi-link beamforming training packet that comprises a format designed for simultaneous training of multiple wireless links. In some embodiments, such a multi-link beamforming training packet may comprise a respective set of training fields for each of the multiple wireless links being trained. For example, in operating environment 100, 60 GHz-capable device 102 may simultaneously train two or more of beamformed wireless links 106-1, 106-2, 106-3, 106-4, and 106-5 using a multi-link beamforming training packet comprising respective sets of training fields for each of those two or more of beamformed wireless links 106-1, 106-2, 106-3, 106-4, and 106-5. The embodiments are not limited to this example.

Figure 2A:
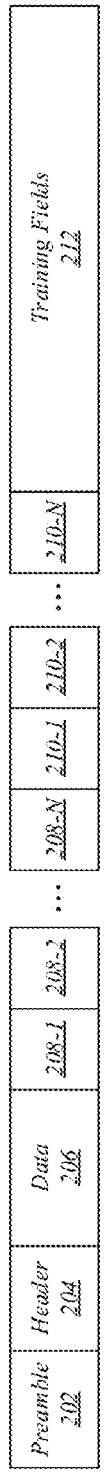
FIG. 2A illustrates an embodiment of a beamforming training packet.

FIG. 2A illustrates an example of a beamforming training packet 200 that may be representative of a multi-link beamforming training packet that may be used in various embodiments to simultaneously train multiple beamformed wireless links in a 60 GHz wireless network. For example, beamforming training packet 200 may be representative of a multi-link beamforming training packet that 60 GHz-capable device 102 of FIG. 1 may use in some embodiments to simultaneously train two or more of beamformed wireless links 106-1, 106-2, 106-3, 106-4, and 106-5.

As shown in FIG. 2A, beamforming training packet 200 comprises a preamble 202, a header 204, a data field 206, a series of preambles 208-1 to 208-N, a series of headers 210-1 to 210-N, and a set of training fields 212. In various embodiments, preamble 202 may comprise a legacy preamble, and header 204 may comprise a legacy header. In some embodiments, preamble 202 and header 204 may comprise formats defined in IEEE 802.11ad-2012. In various embodiments, preamble 202 and header 204 may include an indication in an extended control PHY header that beamforming training packet 200 comprises a special packet structure for multi-link beamforming training. In some embodiments, the extended control PHY header may indicate how many preambles 208-1 to 208-N and headers 210-1 to 210-N appear following data field 206, as well as the numbers of transmit (TX) and receive (RX) training sectors. In various embodiments, data field 206 may comprise data that is intended for a particular 60 GHz-capable device within the wireless network.

In some embodiments, each preamble 208-1 to 208-N may be transmitted in a different direction. In various embodiments, each preamble 208-1 to 208-N may enable a specific device to synchronize on the packet timing and on when a respective header will be transmitted. In some embodiments, each preamble 208-1 to 208-N may be composed of an IEEE 802.11ad control PHY STF+CE (short training field and channel estimate). In various embodiments, the STF may be shortened, and a specific sync sequence may be attached to each preamble to indicate its order in the sequence.

In some embodiments, each header 210-1 to 210-N may comprise an extended IEEE 802-11ad header. In various embodiments, each header 210-1 to 210-N may include an association identifier (AID) for a respective 60 GHz-capable device, as well as an indication of the position of that header within the header sequence. In some embodiments, each header 210-1 to 210-N may comprise a legacy header in which a one-bit indication is used to indicate that the header comprises an extended header. In various embodiments, each header 210-1 to 210-N may comprise information identifying the number of TX and RX sectors. In some embodiments, headers 210-1 to 210-N may each comprise LDPC parity bytes. In various embodiments, each header 210-1 to 210-N may comprise up to six bytes of additional information. In some embodiments, rather than appearing following preambles 208-1 to 208-N, headers 210-1 to 210-N may be interleaved with preambles 208-1 to 208-N, such that each preamble 208-i is followed by a header 210-i. The embodiments are not limited in this context.

Figure 2B:
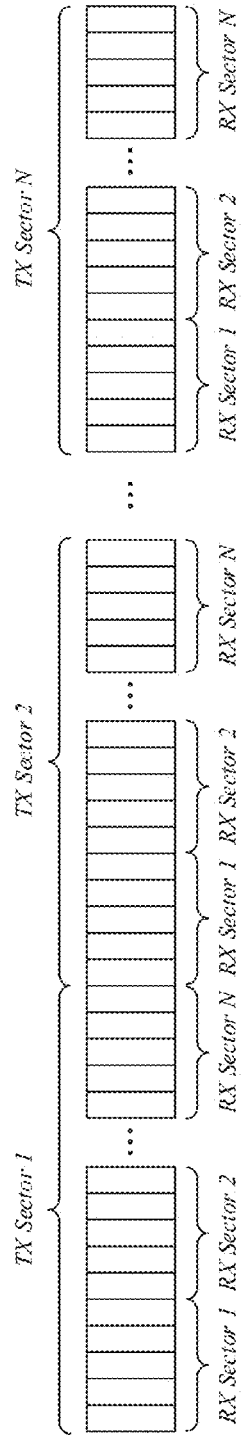
FIG. 2B illustrates an embodiment of a training field sequence.

FIG. 2B illustrates an example of a training field sequence 220 that may be representative of the sequence of training fields 212 in beamforming training packet 200 of FIG. 2A in various embodiments. As shown in FIG. 2B, training field sequence 220 contains—for each of a plurality of TX sectors—a respective set of training fields. Each such set contains a respective training field subset for each of a plurality of RX sectors. The embodiments are not limited to this example.

Figure 3:
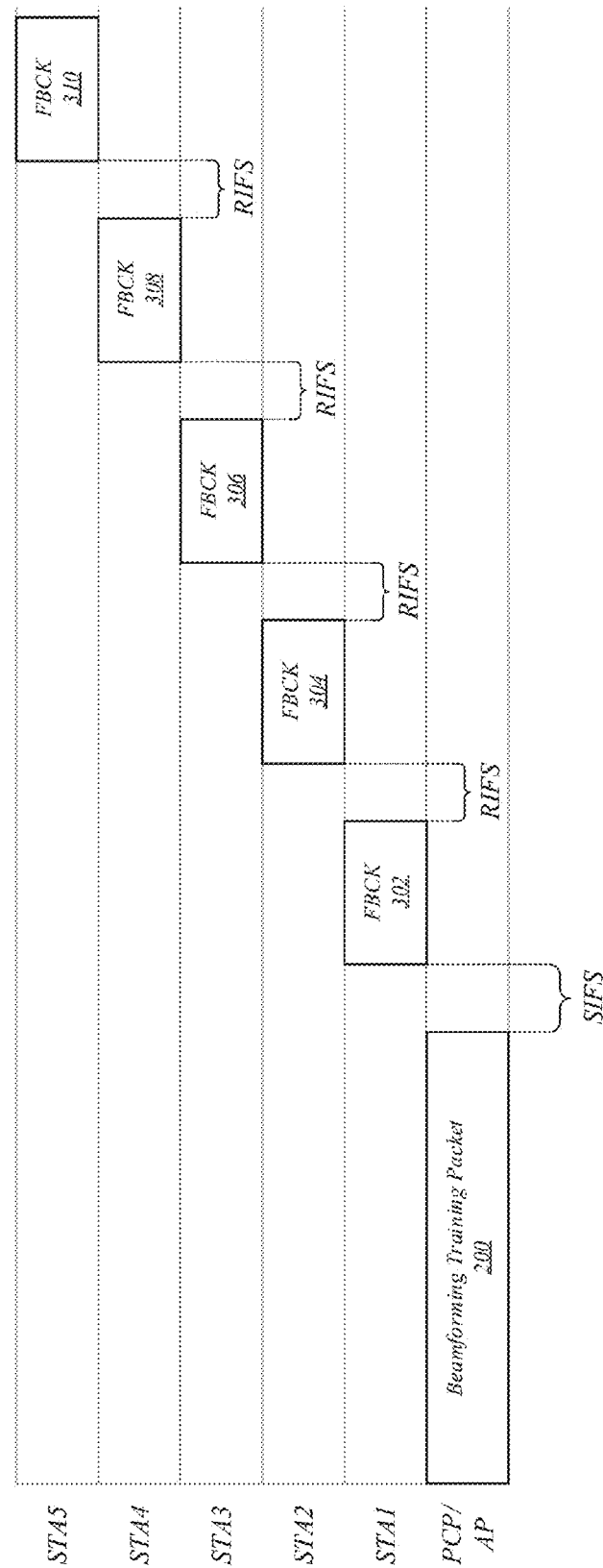
FIG. 3 illustrates an embodiment of a communication sequence.

FIG. 3 illustrates an example of a communication sequence 300 that may be representative of the implementation of multi-link beamforming training techniques for 60 GHz wireless networks in various embodiments. For example, communication sequence 300 may be representative of a series of communications that may be performed in wireless network 101 of FIG. 1 in some embodiments in which 60 GHz-capable device 102 uses beamforming training packet 200 of FIG. 2A to simultaneously train two or more of beamformed wireless links 106-1, 106-2, 106-3, 106-4, and 106-5.

In communication sequence 300, following transmission of beamforming training packet 200 by a PCP/AP, a series of feedback responses FBCK 302, FBCK 304, FBCK 306, FBCK 308, and FBCK 310 are transmitted to the PCP/AP by respective 60 GHz-capable devices STA1, STA2, STA3, STA4, and STA5. In various embodiments, the first device to respond to beamforming training packet 200 may be the device to which the data in data field 206 was addressed. In this example, that device may be STA1, which may transmit FBCK 302 to the PCP/AP. In some embodiments, the transmissions of beamforming training packet 200 and FBCK 302 may be separated in time by a short interframe space (SIFS). In some embodiments, after the initial feedback response is transmitted by the device to which the data in data field 206 was addressed, additional feedback responses may be transmitted by the various devices identified by the AIDs in headers 210-1 to 210-N. In various embodiments, each such additional feedback response may be separated in time from the transmission that precedes it by a reduced interframe space (RIFS). In some embodiments, the order in which these additional feedback responses are transmitted may correspond to the order of the headers 210-1 to 210-N in which the AIDs appear. In this example, FBCK 302 is followed, in chronological order, by FBCK 304, FBCK 306, FBCK 308, and FBCK 310, indicating that header 210-1 comprises an AID for STA2, header 210-2 comprises an AID for STA3, header 210-3 comprises an AID for STA 4, and header 210-4 comprises an AID for STA 5. The embodiments are not limited to this example.

Another approach to enabling devices to achieve synchronization may involve the use of an alternate wireless frequency band. For example, in some embodiments, prior to transmission of a multi-link beamforming training packet, a multi-cast packet may be sent via the 2.4 GHz band or 5 GHz band that indicates when transmission of the multi-link beamforming training packet will commence, and that designates an order in which responses to the multi-link beamforming training packet are to be transmitted. In such embodiments, the multi-link beamforming training packet may not need to include preambles 208-1 to 208-N or headers 210-1 to 210-N. In various such embodiments, IEEE 802.11ad automatic gain control (AGC) fields may be utilized. In some such embodiments, responses to the multi-link beamforming training packet may be sent via the 2.4 GHz band or the 5 GHz band. The embodiments are not limited in this context.

It is worthy of note that in various embodiments, according to either approach, a 60 GHz-capable device that is associated with a PCP/AP that transmits a multi-link beamforming training packet may use that multi-link beamforming training packet even if it is not among the devices to which the multi-link beamforming training packet is directed. In some embodiments, such a 60 GHz-capable device may use a separate channel access to send feedback in response to the multi-link beamforming training packet. The embodiments are not limited in this context.

Figure 4:
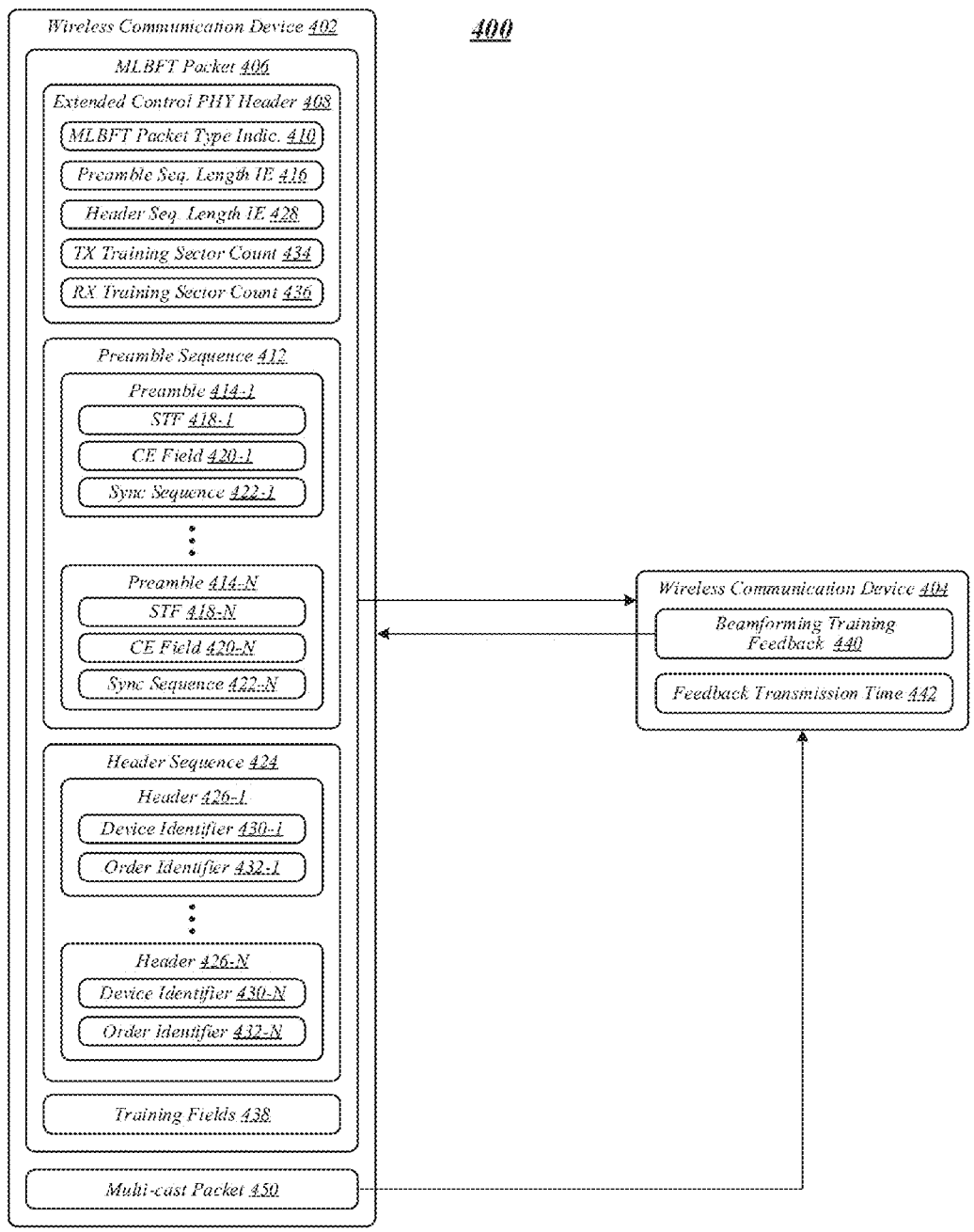
FIG. 4 illustrates an embodiment of a second operating environment.

FIG. 4 illustrates an example of an operating environment 400 that may be representative of the implementation of one or more of the disclosed multi-link beamforming training techniques according to various embodiments. In operating environment 400, a wireless communication device 402 may identify a plurality of links to be trained via a multi-link beamforming training procedure. In some embodiments, the plurality of links may comprise a plurality of 60 GHz frequency band wireless links. In various embodiments, wireless communication device 402 may operate as a PCP/AP. In some embodiments, wireless communication device 402 may be the same as—or similar to –60 GHz-capable device 102 of FIG. 1. In various embodiments, each of the plurality of links may comprise a wireless link with a respective one of a plurality of remote devices. In some embodiments, the plurality of remote devices may include a communication device 404. In various embodiments, wireless communication device 404 may comprise a DMG STA. In some embodiments, wireless communication device 404 may be the same as—or similar to—any one of 60 GHz-capable devices 104-1 to 104-5 of FIG. 1. The embodiments are not limited in this context.

In various embodiments, during the multi-link beamforming training procedure, wireless communication device 402 may transmit a multi-link beamforming training (MLBFT) packet 406. In some embodiments, multi-link beamforming training packet 406 may be the same as—or similar to— beamforming training packet 200 of FIG. 2A. In various embodiments, multi-link beamforming training packet 406 may comprise an extended control PHY header 408. In some embodiments, extended control PHY header 408 may comprise a multi-link beamforming training packet type indicator 410. In various embodiments, multi-link beamforming training packet type indicator 410 may comprise a flag, bit, field, parameter value, or other type of information element set to indicate that multi-link beamforming training packet 406 is a packet of a multi-link beamforming training type. The embodiments are not limited in this context.

In some embodiments, multi-link beamforming training packet 406 may comprise a preamble sequence 412. In various embodiments, preamble sequence 412 may comprise a sequence of N preambles 414-1 to 414-N. In some embodiments, preambles 414-1 to 414-N may be the same as—or similar to—preambles 208-1 to 208-N of FIG. 2A. In various embodiments, extended control PHY header 408 may comprise a preamble sequence length information element (IE) 416 that indicates the number N of preambles comprised in preamble sequence 412. In some embodiments, preambles 414-1 to 414-N may comprise respective short training fields (STFs) 418-1 to 418-N. In various embodiments, STFs 418-1 to 418-N may comprise shortened STFs. In some embodiments, preambles 414-1 to 414-N may comprise respective channel estimation (CE) fields 420-1 to 420-N. In various embodiments, preambles 414-1 to 414-N may comprise respective sync sequences 422-1 to 422-N. In some embodiments, each of sync sequences 422-1 to 422-N may indicate an order of its corresponding one of preambles 414-1 to 414-N within preamble sequence 412. In various embodiments, wireless communication device 402 may transmit each of preambles 414-1 to 414-N in a different direction. The embodiments are not limited in this context.

In some embodiments, multi-link beamforming training packet 406 may comprise a header sequence 424. In various embodiments, header sequence 424 may comprise a sequence of N headers 426-1 to 426-N. In some embodiments, header sequence 424 may comprise a respective corresponding header for each preamble of preamble sequence 412. In various embodiments, headers 426-1 to 426-N may be the same as—or similar to—headers 210-1 to 210-N of FIG. 2A. In some embodiments, extended control PHY header 408 may comprise a header sequence length IE 428 that indicates the number N of headers comprised in header sequence 424. In various embodiments, rather than comprising separate preamble sequence length and header sequence length IEs 416 and 428, extended control PHY header 408 may comprise an IE that indicates both the number of preambles in preamble sequence 412 and the number of headers in header sequence 424. The embodiments are not limited in this context.

In some embodiments, headers 426-1 to 426-N may comprise respective device identifiers 430-1 to 430-N. In various embodiments, each of device identifiers 430-1 to 430-N may comprise a value identifying a respective one of the plurality of remote devices. In some embodiments, for example, each of device identifiers 430-1 to 430-N may comprise an association identifier (AID) for a respective one of the plurality of remote devices. In various embodiments, headers 426-1 to 426-N may comprise respective order identifiers 432-1 to 432-N. In some embodiments, each of order identifiers 432-1 to 432-N may comprise a value indicating an order of its corresponding one of headers 426-1 to 426-N within header sequence 424. In various embodiments, header sequence 424 may generally indicate a feedback order applicable to the transmission of beamforming training feedback by the plurality of remote devices. In some such embodiments, the order in which headers 426-1 to 426-N appear in header sequence 424 may indicate the feedback order. In various embodiments, preamble sequence 412 may precede header sequence 424 within multi-link beamforming training packet 406. In some other embodiments, preamble sequence 412 may be interleaved with header sequence 424 within multi-link beamforming training packet 406. The embodiments are not limited in this context.

In various embodiments, extended control PHY header 408 may comprise a TX training sector count 434. In some embodiments, TX training sector count 434 may comprise a value indicating a number of TX sectors to be trained according to the multi-link beamforming training procedure during which wireless communication device 402 transmits multi-link beamforming training packet 406. In various embodiments, extended control PHY header 408 may comprise an RX training sector count 436. In some embodiments, RX training sector count 436 may comprise a value indicating a number of RX sectors to be trained according to the multi-link beamforming training procedure during which wireless communication device 402 transmits multi-link beamforming training packet 406. In various embodiments, multi-link beamforming training packet 406 may comprise training fields 438. In some embodiments, training fields 438 may be the same as—or similar to—training fields 212 of FIG. 2A. In various embodiments, training fields 434 may include a respective set of training fields for each TX sector to be trained according to the multi-link beamforming training procedure. In some embodiments, each such set of training fields may comprise a respective training field subset for each RX sector to be trained according to the multi-link beamforming training procedure. The embodiments are not limited in this context.

In various embodiments, upon receipt of multi-link beamforming training packet 406, wireless communication device 404 may identify multi-link beamforming training packet 406 as a multi-link beamforming training packet based on multi-link beamforming training packet type indicator 410. In some embodiments, wireless communication device 404 may train a wireless link with wireless communication device 402 based on one or more of the training fields 438 comprised in multi-link beamforming training packet 406. In various embodiments, in conjunction with training the wireless link with wireless communication device 402, wireless communication device 404 may generate beamforming training feedback 440. In some embodiments, wireless communication device 404 may identify a feedback transmission time 442 comprising a time at which wireless communication device 404 is to transmit beamforming training feedback 440 to wireless communication device 402. In various embodiments, wireless communication device 404 may identify a feedback order for multi-link beamforming training packet 406 and determine feedback transmission time 442 based on the feedback order. In some embodiments, wireless communication device 404 may identify the feedback order based on header sequence 424. In various embodiments, wireless communication device 404 may identify, from among headers 426-1 to 426-N, a header containing a device identifier associated with wireless communication device 404 and may determine feedback transmission time 442 based on a position of the identified header within header sequence 424. For example, in some embodiments, wireless communication device 404 determine that device identifier 430-1 comprises an AID for wireless communication device 404 and determine feedback transmission time 440 based on the position of header 426-1 within header sequence 424. In various embodiments, wireless communication device 404 may transmit beamforming training feedback 440 to wireless communication device 402 at feedback transmission time 442. The embodiments are not limited in this context.

It is worthy of note that in some embodiments, prior to the transmission of multi-link beamforming training packet 406, wireless communication device 402 may transmit a packet that identifies the feedback order for multi-link beamforming training packet 406. For example, in various embodiments, wireless communication device 402 may transmit a multi-cast packet 450 that identifies the feedback order for multi-link beamforming training packet 406, and wireless communication device 404 may identify the feedback order for multi-link beamforming training packet 406 and determine feedback transmission time 442 based on multi-cast packet 450. In some embodiments, multi-cast packet 450 may indicate a start time for multi-link beamforming training packet 406. In various embodiments, multi-cast packet 450 may be transmitted via a different frequency band than multi-link beamforming training packet 406. In some embodiments, for example, wireless communication device 404 may receive multi-cast packet 450 via carriers of the 2.4 GHz frequency band or 5 GHz frequency band, and may receive multi-link beamforming training packet 406 via carriers of the 60 GHz frequency band. In various embodiments, wireless communication device 404 may transmit beamforming training feedback 440 via a different frequency band than that via which it receives one or both of multi-cast packet 450 and multi-link beamforming training packet 406. In some embodiments, for example, wireless communication device 404 may receive multi-link beamforming training packet 406 via carriers of the 60 GHz frequency band and transmit beamforming training feedback 440 via carriers of the 2.4 GHz frequency band. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
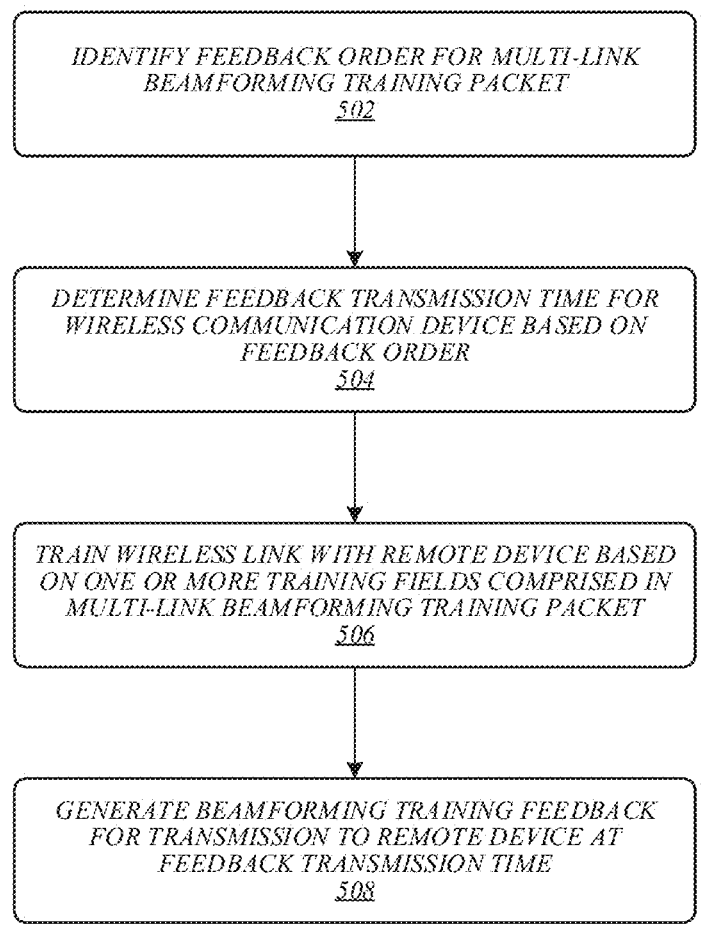
FIG. 5 illustrates an embodiment of a first logic flow.

FIG. 5 illustrates an example of a logic flow 500 that may be representative of the implementation of one or more of the disclosed multi-link beamforming training techniques according to various embodiments. For example, logic flow 500 may be representative of operations that may be performed in some embodiments by wireless communication device 404 in operating environment 400 of FIG. 4. As shown in FIG. 5, a feedback order for a multi-link beamforming training packet may be identified at 502. For example, in operating environment 400 of FIG. 4, wireless communication device 404 may identify a feedback order for multi-link beamforming training packet 406. At 504, a feedback transmission time for the wireless communication device may be determined based on the feedback order. For example, in operating environment 400 of FIG. 4, wireless communication device 404 may determine feedback transmission time 442 based on a feedback order that it has identified for multi-link beamforming training packet 406.

At 506, a wireless link with a remote device may be trained based on one or more training fields comprised in the multi-link beamforming training packet. For example, in operating environment 400 of FIG. 4, wireless communication device 404 may train a wireless link with wireless communication device 402 based on one or more of the training fields 438 comprised in multi-link beamforming training packet 406. At 508, beamforming training feedback for transmission to the remote device at the feedback transmission time may be generated. For example, in operating environment 400 of FIG. 4, wireless communication device 404 may generate beamforming training feedback 440 for transmission to wireless communication device 402 at feedback transmission time 442. The embodiments are not limited to these examples.

Figure 6:
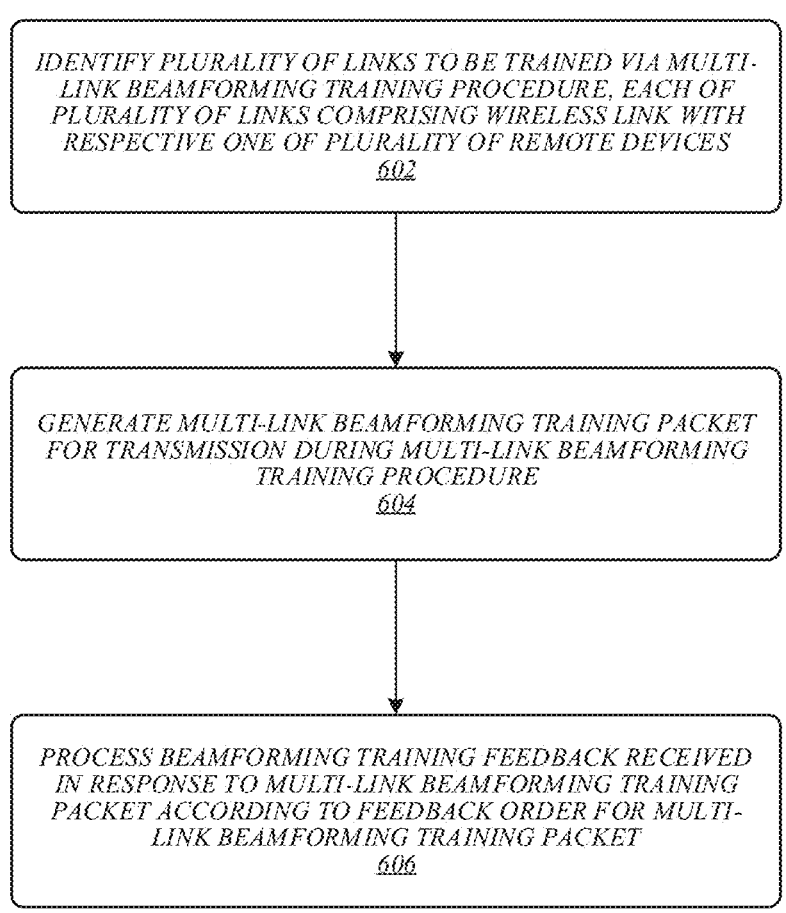
FIG. 6 illustrates an embodiment of a second logic flow.

FIG. 6 illustrates an example of a logic flow 600 that may be representative of the implementation of one or more of the disclosed multi-link beamforming training techniques according to various embodiments. For example, logic flow 600 may be representative of operations that may be performed in some embodiments by wireless communication device 402 in operating environment 400 of FIG. 4. As shown in FIG. 6, a plurality of links to be trained via a multi-link beamforming training procedure may be identified at 602, where each of the plurality of links comprises a wireless link with a respective one of a plurality of remote devices. For example, in operating environment 400 of FIG. 4, wireless communication device 402 may identify a plurality of links to be trained via a multi-link beamforming training procedure, and each of the plurality of links may comprise a wireless link with a respective one of a plurality of remote devices.

At 604, a multi-link beamforming training packet may be generated for transmission during the multi-link beamforming training procedure. For example, in operating environment 400 of FIG. 4, wireless communication device 402 may generate multi-link beamforming training packet 406 for transmission during the multi-link beamforming training procedure. At 606, beamforming training feedback received in response to the multi-link beamforming training packet may be processed according to a feedback order for the multi-link beamforming training packet. For example, in operating environment 400 of FIG. 4, wireless communication device 402 may process received beamforming training feedback according to a feedback order for multi-link beamforming training packet 406. The embodiments are not limited to these examples.

In some embodiments, one or more of the disclosed multi-link beamforming training techniques may be implemented fully or partially in software and/or firmware. In various embodiments, such software and/or firmware may take the form of instructions contained in or on a non-transitory computer-readable storage medium. In some embodiments, such instructions may be read and executed by one or more processors to enable performance of operations described herein. Such instructions may comprise any suitable form, such as—but not limited to—source code, compiled code, interpreted code, executable code, static code, dynamic code, and the like. Such a computer-readable medium may include any tangible non-transitory medium for storing information in a form readable by one or more computers, such as—but not limited to—read only memory (ROM), random access memory (RAM), magnetic disk storage media, optical storage media, a flash memory, etc.

Figure 7:
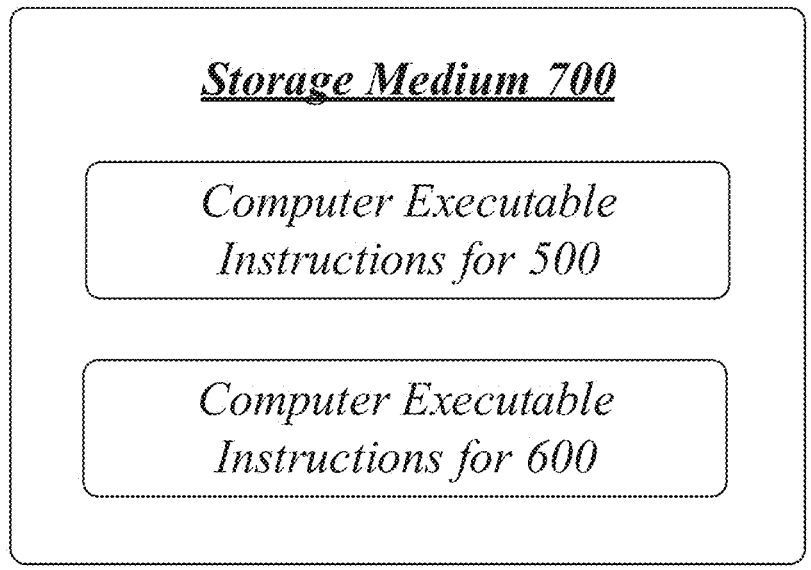
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or both of logic flow 500 of FIG. 5 and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
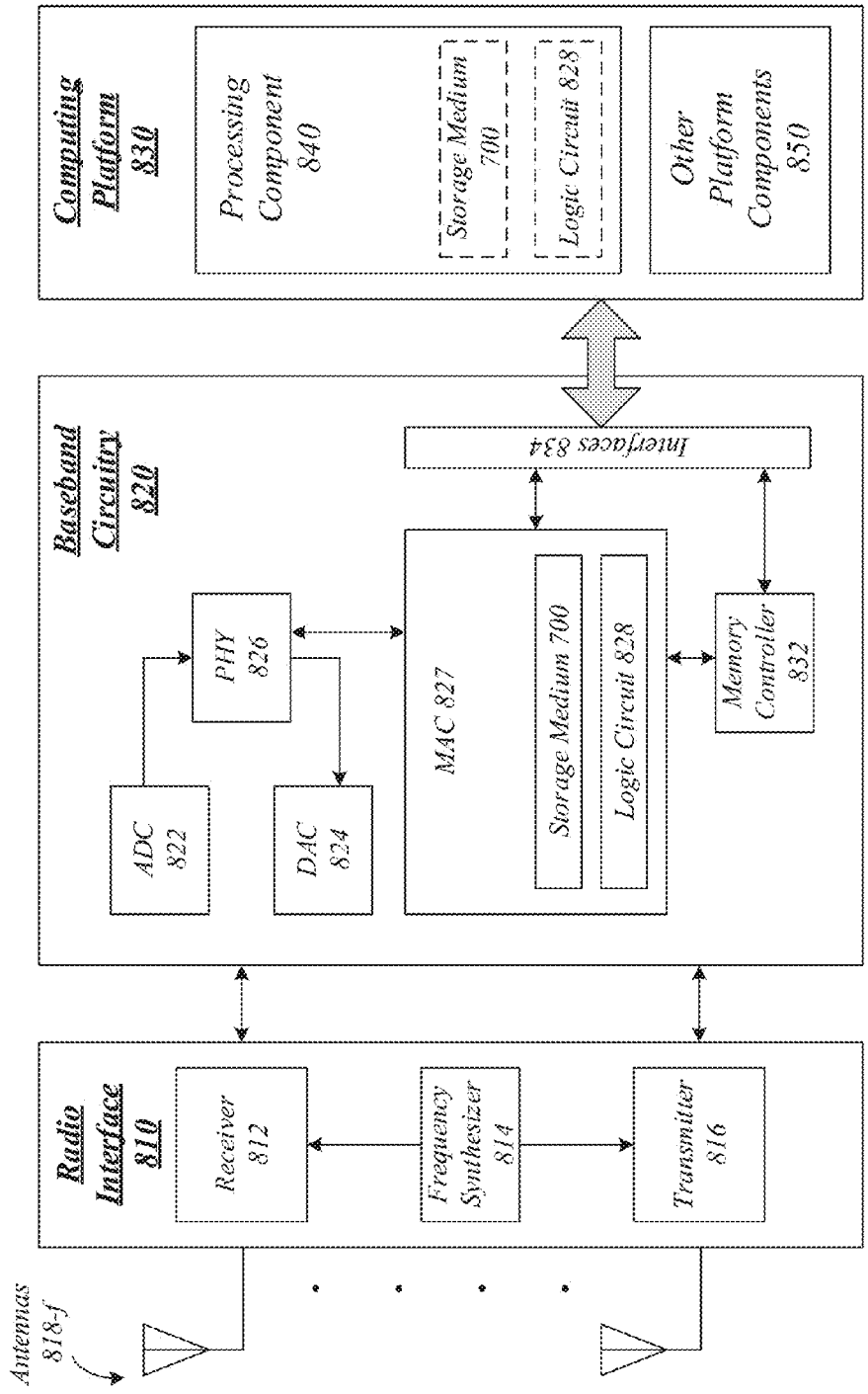
FIG. 8 illustrates an embodiment of a device.

FIG. 8 illustrates an embodiment of a communications device 800 that may implement one or more of wireless communication devices 402 and 404 of FIG. 4, logic flow 500 of FIG. 5, logic flow 600 of FIG. 6, and storage medium 700 of FIG. 7. In various embodiments, device 800 may comprise a logic circuit 828. The logic circuit 828 may include physical circuits to perform operations described for one or more of wireless communication devices 402 and 404 of FIG. 4, logic flow 500 of FIG. 5, and logic flow 600 of FIG. 6, for example. As shown in FIG. 8, device 800 may include a radio interface 810, baseband circuitry 820, and computing platform 830, although the embodiments are not limited to this configuration.

The device 800 may implement some or all of the structure and/or operations for one or more of wireless communication devices 402 and 404 of FIG. 4, logic flow 500 of FIG. 5, logic flow 600 of FIG. 6, storage medium 700 of FIG. 7, and logic circuit 828 in a single computing entity, such as entirely within a single device. Alternatively, the device 800 may distribute portions of the structure and/or operations for one or more of wireless communication devices 402 and 404 of FIG. 4, logic flow 500 of FIG. 5, logic flow 600 of FIG. 6, storage medium 700 of FIG. 7, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of wireless communication devices 402 and 404 of FIG. 4, logic flow 500 of FIG. 5, logic flow 600 of FIG. 6, storage medium 700 of FIG. 7, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-*f*) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
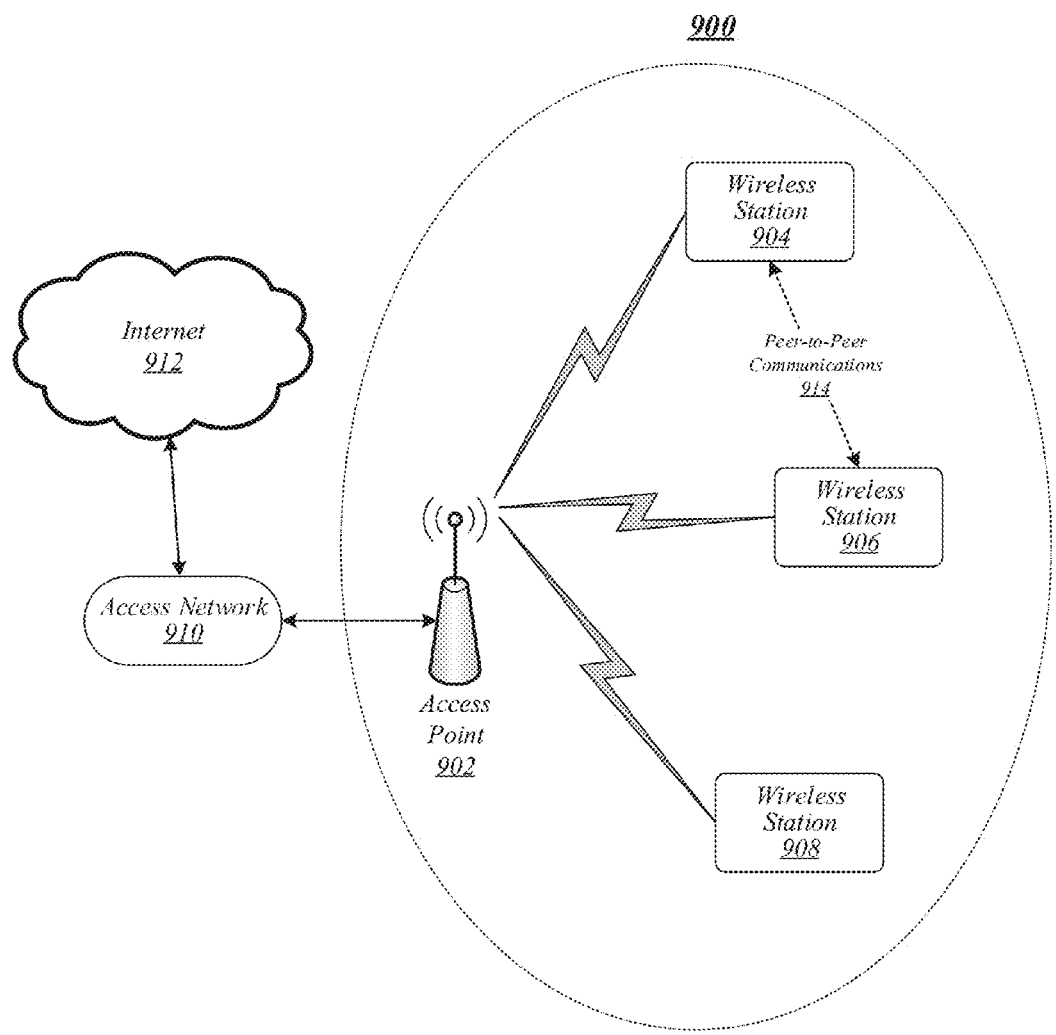
FIG. 9 illustrates an embodiment of a wireless network.

FIG. 9 illustrates an embodiment of a wireless network 900. As shown in FIG. 9, wireless network comprises an access point 902 and wireless stations 904, 906, and 908. In various embodiments, wireless network 900 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 900 may comprise another type of wireless network, and/or may implement other wireless communications standards. In various embodiments, for example, wireless network 900 may comprise a WWAN or WPAN rather than a WLAN. The embodiments are not limited to this example.

In some embodiments, wireless network 900 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 904, 906, and 908 may communicate with access point 902 in order to obtain connectivity to one or more external data networks. In some embodiments, for example, wireless stations 904, 906, and 908 may connect to the Internet 912 via access point 902 and access network 910. In various embodiments, access network 910 may comprise a private network that provides subscription-based Internet-connectivity, such as an Internet Service Provider (ISP) network. The embodiments are not limited to this example.

In various embodiments, two or more of wireless stations 904, 906, and 908 may communicate with each other directly by exchanging peer-to-peer communications. For example, in the example of FIG. 9, wireless stations 904 and 906 communicate with each other directly by exchanging peer-to-peer communications 914. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a wireless communication device, at least a portion of the logic comprised in circuitry coupled to the memory, the logic to identify a feedback order for a multi-link beamforming training packet, determine a feedback transmission time for the wireless communication device based on the feedback order, train a wireless link with a remote device based on one or more training fields comprised in the multi-link beamforming training packet, and generate beamforming training feedback for transmission to the remote device at the feedback transmission time.

Example 2 is the apparatus of Example 1, the logic to identify the feedback order based on a header sequence comprised in the multi-link beamforming training packet.

Example 3 is the apparatus of Example 2, the logic to identify, among a plurality of headers comprised in the header sequence, a header containing an identifier for the wireless communication device, and determine the feedback transmission time based on a position of the identified header within the header sequence.

Example 4 is the apparatus of Example 3, the identifier for the wireless communication device to comprise an association identifier (AID).

Example 5 is the apparatus of any of Examples 2 to 4, the multi-link beamforming training packet to comprise an extended control physical layer (PHY) header.

Example 6 is the apparatus of Example 5, the logic to identify a received packet as the multi-link beamforming training packet based on an indicator comprised in the extended control PHY header.

Example 7 is the apparatus of any of Examples 5 to 6, the extended control PHY header to comprise an information element indicating a number of preambles comprised in a preamble sequence of the multi-link beamforming training packet.

Example 8 is the apparatus of Example 7, the header sequence to comprise a respective corresponding header for each preamble of the preamble sequence.

Example 9 is the apparatus of any of Examples 7 to 8, each preamble of the preamble sequence to comprise a short training field (STF) and a channel estimation (CE) field.

Example 10 is the apparatus of Example 9, each STF to comprise a shortened STF.

Example 11 is the apparatus of any of Examples 7 to 10, each preamble of the preamble sequence to comprise a sync sequence to indicate an order of that preamble in the preamble sequence.

Example 12 is the apparatus of any of Examples 7 to 11, the preamble sequence to precede the header sequence within the multi-link beamforming training packet.

Example 13 is the apparatus of any of Examples 7 to 11, the preamble sequence interleaved with the header sequence within the multi-link beamforming training packet.

Example 14 is the apparatus of any of Examples 5 to 13, the extended control PHY header to comprise an information element indicating a number of transmit training sectors.

Example 15 is the apparatus of any of Examples 5 to 14, the extended control PHY header to comprise an information element indicating a number of receive training sectors.

Example 16 is the apparatus of Example 1, the logic to identify the feedback order based on a received multi-cast packet indicating an order for responses to the multi-link beamforming training packet.

Example 17 is the apparatus of Example 16, the multi-cast packet to indicate a start time for the multi-link beamforming training packet.

Example 18 is the apparatus of any of Examples 16 to 17, the multi-cast packet to be received via a 2.4 GHz frequency band or a 5 GHz frequency band, the multi-link beamforming training packet to be received via a 60 GHz band.

Example 19 is the apparatus of any of Examples 16 to 18, the beamforming training feedback to be transmitted to the remote device via a 2.4 GHz frequency band.

Example 20 is the apparatus of any of Examples 1 to 19, the wireless link to comprise a 60 GHz frequency band wireless link.

Example 21 is the apparatus of any of Examples 1 to 20, the remote device to comprise a personal basic service set control point/access point (PCP/AP).

Example 22 is the apparatus of any of Examples 1 to 21, the wireless communication device to comprise a directional multi-gigabit (DMG) station (STA).

Example 23 is a system, comprising an apparatus according to any of Examples 1 to 22, and at least one radio frequency (RF) transceiver.

Example 24 is the system of Example 23, comprising at least one processor.

Example 25 is the system of any of Examples 23 to 24, comprising at least one RF antenna.

Example 26 is the system of any of Examples 23 to 25, comprising a touchscreen display.

Example 27 is an apparatus, comprising a memory, and logic for a wireless communication device, at least a portion of the logic comprised in circuitry coupled to the memory, the logic to identify a plurality of links to be trained via a multi-link beamforming training procedure, each of the plurality of links to comprise a wireless link with a respective one of a plurality of remote devices, generate a multi-link beamforming training packet for transmission during the multi-link beamforming training procedure, and process beamforming training feedback received in response to the multi-link beamforming training packet according to a feedback order for the multi-link beamforming training packet.

Example 28 is the apparatus of Example 27, the multi-link beamforming training packet to contain a header sequence comprising a plurality of headers, the header sequence to indicate the feedback order.

Example 29 is the apparatus of Example 28, an order of the plurality of headers within the header sequence to indicate the feedback order.

Example 30 is the apparatus of any of Examples 28 to 29, each of the plurality of headers to comprise an association identifier (AID) for a respective one of the plurality of remote devices.

Example 31 is the apparatus of any of Examples 28 to 30, the multi-link beamforming training packet to comprise an extended control physical layer (PHY) header.

Example 32 is the apparatus of Example 31, the extended control PHY header to comprise a multi-link beamforming training packet type indicator.

Example 33 is the apparatus of any of Examples 31 to 32, the extended control PHY header to comprise an information element indicating a number of preambles comprised in a preamble sequence of the multi-link beamforming training packet.

Example 34 is the apparatus of Example 33, each preamble of the preamble sequence to be transmitted in a different direction.

Example 35 is the apparatus of Example 34, the header sequence to comprise a respective corresponding header for each preamble of the preamble sequence.

Example 36 is the apparatus of any of Examples 34 to 35, each preamble of the preamble sequence to comprise a short training field (STF) and a channel estimation (CE) field.

Example 37 is the apparatus of Example 36, each STF to comprise a shortened STF.

Example 38 is the apparatus of any of Examples 34 to 37, each preamble of the preamble sequence to comprise a sync sequence to indicate an order of that preamble in the preamble sequence.

Example 39 is the apparatus of any of Examples 34 to 38, the preamble sequence to precede the header sequence within the multi-link beamforming training packet.

Example 40 is the apparatus of any of Examples 34 to 38, the preamble sequence interleaved with the header sequence within the multi-link beamforming training packet.

Example 41 is the apparatus of any of Examples 31 to 40, the extended control PHY header to comprise an information element indicating a number of transmit training sectors.

Example 42 is the apparatus of any of Examples 31 to 41, the extended control PHY header to comprise an information element indicating a number of receive training sectors.

Example 43 is the apparatus of Example 27, the logic to generate a multi-cast packet for transmission to the plurality of remote devices, the multi-cast packet to indicate the feedback order.

Example 44 is the apparatus of Example 43, the multi-cast packet to indicate a start time for the multi-link beamforming training packet.

Example 45 is the apparatus of any of Examples 43 to 44, the multi-cast packet to be transmitted via a 2.4 GHz frequency band or a 5 GHz frequency band, the multi-link beamforming training packet to be transmitted via a 60 GHz band.

Example 46 is the apparatus of Example 45, the beamforming training feedback to be received via a 2.4 GHz frequency band.

Example 47 is the apparatus of any of Examples 27 to 46, the plurality of wireless links to comprise 60 GHz frequency band wireless links.

Example 48 is the apparatus of any of Examples 27 to 47, the wireless communication device to comprise a personal basic service set control point/access point (PCP/AP).

Example 49 is the apparatus of any of Examples 27 to 48, the plurality of remote devices to comprise directional multi-gigabit (DMG) stations (STAs).

Example 50 is a system, comprising an apparatus according to any of Examples 27 to 49, and at least one radio frequency (RF) transceiver.

Example 51 is the system of Example 50, comprising at least one processor.

Example 52 is the system of any of Examples 50 to 51, comprising at least one RF antenna.

Example 53 is the system of any of Examples 50 to 52, comprising a touchscreen display.

Example 54 is at least one computer-readable storage medium comprising a set of instructions that, in response to being executed at a wireless communication device, cause the wireless communication device to identify a feedback order for a multi-link beamforming training packet, determine a feedback transmission time for the wireless communication device based on the feedback order, train a wireless link with a remote device based on one or more training fields comprised in the multi-link beamforming training packet, and generate beamforming training feedback for transmission to the remote device at the feedback transmission time.

Example 55 is the at least one computer-readable storage medium of Example 54, comprising instructions that, in response to being executed at the wireless communication device, cause the wireless communication device to identify the feedback order based on a header sequence comprised in the multi-link beamforming training packet.

Example 56 is the at least one computer-readable storage medium of Example 55, comprising instructions that, in response to being executed at the wireless communication device, cause the wireless communication device to identify, among a plurality of headers comprised in the header sequence, a header containing an identifier for the wireless communication device, and determine the feedback transmission time based on a position of the identified header within the header sequence.

Example 57 is the at least one computer-readable storage medium of Example 56, the identifier for the wireless communication device to comprise an association identifier (AID).

Example 58 is the at least one computer-readable storage medium of any of Examples 55 to 57, the multi-link beamforming training packet to comprise an extended control physical layer (PHY) header.

Example 59 is the at least one computer-readable storage medium of Example 58, comprising instructions that, in response to being executed at the wireless communication device, cause the wireless communication device to identify a received packet as the multi-link beamforming training packet based on an indicator comprised in the extended control PHY header.

Example 60 is the at least one computer-readable storage medium of any of Examples 58 to 59, the extended control PHY header to comprise an information element indicating a number of preambles comprised in a preamble sequence of the multi-link beamforming training packet.

Example 61 is the at least one computer-readable storage medium of Example 60, the header sequence to comprise a respective corresponding header for each preamble of the preamble sequence.

Example 62 is the at least one computer-readable storage medium of any of Examples 60 to 61, each preamble of the preamble sequence to comprise a short training field (STF) and a channel estimation (CE) field.

Example 63 is the at least one computer-readable storage medium of Example 62, each STF to comprise a shortened STF.

Example 64 is the at least one computer-readable storage medium of any of Examples 60 to 63, each preamble of the preamble sequence to comprise a sync sequence to indicate an order of that preamble in the preamble sequence.

Example 65 is the at least one computer-readable storage medium of any of Examples 60 to 64, the preamble sequence to precede the header sequence within the multi-link beamforming training packet.

Example 66 is the at least one computer-readable storage medium of any of Examples 60 to 64, the preamble sequence interleaved with the header sequence within the multi-link beamforming training packet.

Example 67 is the at least one computer-readable storage medium of any of Examples 58 to 66, the extended control PHY header to comprise an information element indicating a number of transmit training sectors.

Example 68 is the at least one computer-readable storage medium of any of Examples 58 to 67, the extended control PHY header to comprise an information element indicating a number of receive training sectors.

Example 69 is the at least one computer-readable storage medium of Example 54, comprising instructions that, in response to being executed at the wireless communication device, cause the wireless communication device to identify the feedback order based on a received multi-cast packet indicating an order for responses to the multi-link beamforming training packet.

Example 70 is the at least one computer-readable storage medium of Example 69, the multi-cast packet to indicate a start time for the multi-link beamforming training packet.

Example 71 is the at least one computer-readable storage medium of any of Examples 69 to 70, the multi-cast packet to be received via a 2.4 GHz frequency band or a 5 GHz frequency band, the multi-link beamforming training packet to be received via a 60 GHz band.

Example 72 is the at least one computer-readable storage medium of any of Examples 69 to 71, the beamforming training feedback to be transmitted to the remote device via a 2.4 GHz frequency band.

Example 73 is the at least one computer-readable storage medium of any of Examples 54 to 72, the wireless link to comprise a 60 GHz frequency band wireless link.

Example 74 is the at least one computer-readable storage medium of any of Examples 54 to 73, the remote device to comprise a personal basic service set control point/access point (PCP/AP).

Example 75 is the at least one computer-readable storage medium of any of Examples 54 to 74, the wireless communication device to comprise a directional multi-gigabit (DMG) station (STA).

Example 76 is at least one computer-readable storage medium comprising a set of instructions that, in response to being executed at a wireless communication device, cause the wireless communication device to identify a plurality of links to be trained via a multi-link beamforming training procedure, each of the plurality of links to comprise a wireless link with a respective one of a plurality of remote devices, generate a multi-link beamforming training packet for transmission during the multi-link beamforming training procedure, and process beamforming training feedback received in response to the multi-link beamforming training packet according to a feedback order for the multi-link beamforming training packet.

Example 77 is the at least one computer-readable storage medium of Example 76, the multi-link beamforming training packet to contain a header sequence comprising a plurality of headers, the header sequence to indicate the feedback order.

Example 78 is the at least one computer-readable storage medium of Example 77, an order of the plurality of headers within the header sequence to indicate the feedback order.

Example 79 is the at least one computer-readable storage medium of any of Examples 77 to 78, each of the plurality of headers to comprise an association identifier (AID) for a respective one of the plurality of remote devices.

Example 80 is the at least one computer-readable storage medium of any of Examples 77 to 79, the multi-link beamforming training packet to comprise an extended control physical layer (PHY) header.

Example 81 is the at least one computer-readable storage medium of Example 80, the extended control PHY header to comprise a multi-link beamforming training packet type indicator.

Example 82 is the at least one computer-readable storage medium of any of Examples 80 to 81, the extended control PHY header to comprise an information element indicating a number of preambles comprised in a preamble sequence of the multi-link beamforming training packet.

Example 83 is the at least one computer-readable storage medium of Example 82, each preamble of the preamble sequence to be transmitted in a different direction.

Example 84 is the at least one computer-readable storage medium of Example 83, the header sequence to comprise a respective corresponding header for each preamble of the preamble sequence.

Example 85 is the at least one computer-readable storage medium of any of Examples 83 to 84, each preamble of the preamble sequence to comprise a short training field (STF) and a channel estimation (CE) field.

Example 86 is the at least one computer-readable storage medium of Example 85, each STF to comprise a shortened STF.

Example 87 is the at least one computer-readable storage medium of any of Examples 83 to 86, each preamble of the preamble sequence to comprise a sync sequence to indicate an order of that preamble in the preamble sequence.

Example 88 is the at least one computer-readable storage medium of any of Examples 83 to 87, the preamble sequence to precede the header sequence within the multi-link beamforming training packet.

Example 89 is the at least one computer-readable storage medium of any of Examples 83 to 87, the preamble sequence interleaved with the header sequence within the multi-link beamforming training packet.

Example 90 is the at least one computer-readable storage medium of any of Examples 80 to 89, the extended control PHY header to comprise an information element indicating a number of transmit training sectors.

Example 91 is the at least one computer-readable storage medium of any of Examples 80 to 90, the extended control PHY header to comprise an information element indicating a number of receive training sectors.

Example 92 is the at least one computer-readable storage medium of Example 76, comprising instructions that, in response to being executed at the wireless communication device, cause the wireless communication device to generate a multi-cast packet for transmission to the plurality of remote devices, the multi-cast packet to indicate the feedback order.

Example 93 is the at least one computer-readable storage medium of Example 92, the multi-cast packet to indicate a start time for the multi-link beamforming training packet.

Example 94 is the at least one computer-readable storage medium of any of Examples 92 to 93, the multi-cast packet to be transmitted via a 2.4 GHz frequency band or a 5 GHz frequency band, the multi-link beamforming training packet to be transmitted via a 60 GHz band.

Example 95 is the at least one computer-readable storage medium of Example 94, the beamforming training feedback to be received via a 2.4 GHz frequency band.

Example 96 is the at least one computer-readable storage medium of any of Examples 76 to 95, the plurality of wireless links to comprise 60 GHz frequency band wireless links.

Example 97 is the at least one computer-readable storage medium of any of Examples 76 to 96, the wireless communication device to comprise a personal basic service set control point/access point (PCP/AP).

Example 98 is the at least one computer-readable storage medium of any of Examples 76 to 97, the plurality of remote devices to comprise directional multi-gigabit (DMG) stations (STAs).

Example 99 is a method, comprising identifying, by circuitry of a wireless communication device, a feedback order for a multi-link beamforming training packet, determining a feedback transmission time for the wireless communication device based on the feedback order, training a wireless link with a remote device based on one or more training fields comprised in the multi-link beamforming training packet, and generating beamforming training feedback for transmission to the remote device at the feedback transmission time.

Example 100 is the method of Example 99, comprising identifying the feedback order based on a header sequence comprised in the multi-link beamforming training packet.

Example 101 is the method of Example 100, comprising identifying, among a plurality of headers comprised in the header sequence, a header containing an identifier for the wireless communication device, and determining the feedback transmission time based on a position of the identified header within the header sequence.

Example 102 is the method of Example 101, the identifier for the wireless communication device to comprise an association identifier (AID).

Example 103 is the method of any of Examples 100 to 102, the multi-link beamforming training packet to comprise an extended control physical layer (PHY) header.

Example 104 is the method of Example 103, comprising identifying a received packet as the multi-link beamforming training packet based on an indicator comprised in the extended control PHY header.

Example 105 is the method of any of Examples 103 to 104, the extended control PHY header to comprise an information element indicating a number of preambles comprised in a preamble sequence of the multi-link beamforming training packet.

Example 106 is the method of Example 105, the header sequence to comprise a respective corresponding header for each preamble of the preamble sequence.

Example 107 is the method of any of Examples 105 to 106, each preamble of the preamble sequence to comprise a short training field (STF) and a channel estimation (CE) field.

Example 108 is the method of Example 107, each STF to comprise a shortened STF.

Example 109 is the method of any of Examples 105 to 108, each preamble of the preamble sequence to comprise a sync sequence to indicate an order of that preamble in the preamble sequence.

Example 110 is the method of any of Examples 105 to 109, the preamble sequence to precede the header sequence within the multi-link beamforming training packet.

Example 111 is the method of any of Examples 105 to 109, the preamble sequence interleaved with the header sequence within the multi-link beamforming training packet.

Example 112 is the method of any of Examples 103 to 111, the extended control PHY header to comprise an information element indicating a number of transmit training sectors.

Example 113 is the method of any of Examples 103 to 112, the extended control PHY header to comprise an information element indicating a number of receive training sectors.

Example 114 is the method of Example 99, comprising identifying the feedback order based on a received multi-cast packet indicating an order for responses to the multi-link beamforming training packet.

Example 115 is the method of Example 114, the multi-cast packet to indicate a start time for the multi-link beamforming training packet.

Example 116 is the method of any of Examples 114 to 115, the multi-cast packet to be received via a 2.4 GHz frequency band or a 5 GHz frequency band, the multi-link beamforming training packet to be received via a 60 GHz band.

Example 117 is the method of any of Examples 114 to 116, the beamforming training feedback to be transmitted to the remote device via a 2.4 GHz frequency band.

Example 118 is the method of any of Examples 99 to 117, the wireless link to comprise a 60 GHz frequency band wireless link.

Example 119 is the method of any of Examples 99 to 118, the remote device to comprise a personal basic service set control point/access point (PCP/AP).

Example 120 is the method of any of Examples 99 to 119, the wireless communication device to comprise a directional multi-gigabit (DMG) station (STA).

Example 121 is at least one computer-readable storage medium comprising a set of instructions that, in response to being executed at a computing device, cause the computing device to perform a method according to any of Examples 99 to 120.

Example 122 is an apparatus, comprising means for performing a method according to any of Examples 99 to 120.

Example 123 is a system, comprising the apparatus of Example 122, and at least one radio frequency (RF) transceiver.

Example 124 is the system of Example 123, comprising at least one processor.

Example 125 is the system of any of Examples 123 to 124, comprising at least one RF antenna.

Example 126 is the system of any of Examples 123 to 125, comprising a touchscreen display.

Example 127 is a method, comprising identifying, by circuitry of a wireless communication device, a plurality of links to be trained via a multi-link beamforming training procedure, each of the plurality of links to comprise a wireless link with a respective one of a plurality of remote devices, generating a multi-link beamforming training packet for transmission during the multi-link beamforming training procedure, and processing beamforming training feedback received in response to the multi-link beamforming training packet according to a feedback order for the multi-link beamforming training packet.

Example 128 is the method of Example 127, the multi-link beamforming training packet to contain a header sequence comprising a plurality of headers, the header sequence to indicate the feedback order.

Example 129 is the method of Example 128, an order of the plurality of headers within the header sequence to indicate the feedback order.

Example 130 is the method of any of Examples 128 to 129, each of the plurality of headers to comprise an association identifier (AID) for a respective one of the plurality of remote devices.

Example 131 is the method of any of Examples 128 to 130, the multi-link beamforming training packet to comprise an extended control physical layer (PHY) header.

Example 132 is the method of Example 131, the extended control PHY header to comprise a multi-link beamforming training packet type indicator.

Example 133 is the method of any of Examples 131 to 132, the extended control PHY header to comprise an information element indicating a number of preambles comprised in a preamble sequence of the multi-link beamforming training packet.

Example 134 is the method of Example 133, each preamble of the preamble sequence to be transmitted in a different direction.

Example 135 is the method of Example 134, the header sequence to comprise a respective corresponding header for each preamble of the preamble sequence.

Example 136 is the method of any of Examples 134 to 135, each preamble of the preamble sequence to comprise a short training field (STF) and a channel estimation (CE) field.

Example 137 is the method of Example 136, each STF to comprise a shortened STF.

Example 138 is the method of any of Examples 134 to 137, each preamble of the preamble sequence to comprise a sync sequence to indicate an order of that preamble in the preamble sequence.

Example 139 is the method of any of Examples 134 to 138, the preamble sequence to precede the header sequence within the multi-link beamforming training packet.

Example 140 is the method of any of Examples 134 to 138, the preamble sequence interleaved with the header sequence within the multi-link beamforming training packet.

Example 141 is the method of any of Examples 131 to 140, the extended control PHY header to comprise an information element indicating a number of transmit training sectors.

Example 142 is the method of any of Examples 131 to 141, the extended control PHY header to comprise an information element indicating a number of receive training sectors.

Example 143 is the method of Example 127, comprising generating a multi-cast packet for transmission to the plurality of remote devices, the multi-cast packet to indicate the feedback order.

Example 144 is the method of Example 143, the multi-cast packet to indicate a start time for the multi-link beamforming training packet.

Example 145 is the method of any of Examples 143 to 144, the multi-cast packet to be transmitted via a 2.4 GHz frequency band or a 5 GHz frequency band, the multi-link beamforming training packet to be transmitted via a 60 GHz band.

Example 146 is the method of Example 145, the beamforming training feedback to be received via a 2.4 GHz frequency band.

Example 147 is the method of any of Examples 127 to 146, the plurality of wireless links to comprise 60 GHz frequency band wireless links.

Example 148 is the method of any of Examples 127 to 147, the wireless communication device to comprise a personal basic service set control point/access point (PCP/AP).

Example 149 is the method of any of Examples 127 to 148, the plurality of remote devices to comprise directional multi-gigabit (DMG) stations (STAs).

Example 150 is at least one computer-readable storage medium comprising a set of instructions that, in response to being executed at a computing device, cause the computing device to perform a method according to any of Examples 127 to 149.

Example 151 is an apparatus, comprising means for performing a method according to any of Examples 127 to 149.

Example 152 is a system, comprising the apparatus of Example 151, and at least one radio frequency (RF) transceiver.

Example 153 is the system of Example 152, comprising at least one processor.

Example 154 is the system of any of Examples 152 to 153, comprising at least one RF antenna.

Example 155 is the system of any of Examples 152 to 154, comprising a touchscreen display.

Example 156 is an apparatus, comprising means for identifying, at a wireless communication device, a feedback order for a multi-link beamforming training packet, means for determining a feedback transmission time for the wireless communication device based on the feedback order, means for training a wireless link with a remote device based on one or more training fields comprised in the multi-link beamforming training packet, and means for generating beamforming training feedback for transmission to the remote device at the feedback transmission time.

Example 157 is the apparatus of Example 156, comprising means for identifying the feedback order based on a header sequence comprised in the multi-link beamforming training packet.

Example 158 is the apparatus of Example 157, comprising means for identifying, among a plurality of headers comprised in the header sequence, a header containing an identifier for the wireless communication device, and means for determining the feedback transmission time based on a position of the identified header within the header sequence.

Example 159 is the apparatus of Example 158, the identifier for the wireless communication device to comprise an association identifier (AID).

Example 160 is the apparatus of any of Examples 157 to 159, the multi-link beamforming training packet to comprise an extended control physical layer (PHY) header.

Example 161 is the apparatus of Example 160, comprising means for identifying a received packet as the multi-link beamforming training packet based on an indicator comprised in the extended control PHY header.

Example 162 is the apparatus of any of Examples 160 to 161, the extended control PHY header to comprise an information element indicating a number of preambles comprised in a preamble sequence of the multi-link beamforming training packet.

Example 163 is the apparatus of Example 162, the header sequence to comprise a respective corresponding header for each preamble of the preamble sequence.

Example 164 is the apparatus of any of Examples 162 to 163, each preamble of the preamble sequence to comprise a short training field (STF) and a channel estimation (CE) field.

Example 165 is the apparatus of Example 164, each STF to comprise a shortened STF.

Example 166 is the apparatus of any of Examples 162 to 165, each preamble of the preamble sequence to comprise a sync sequence to indicate an order of that preamble in the preamble sequence.

Example 167 is the apparatus of any of Examples 162 to 166, the preamble sequence to precede the header sequence within the multi-link beamforming training packet.

Example 168 is the apparatus of any of Examples 162 to 166, the preamble sequence interleaved with the header sequence within the multi-link beamforming training packet.

Example 169 is the apparatus of any of Examples 160 to 168, the extended control PHY header to comprise an information element indicating a number of transmit training sectors.

Example 170 is the apparatus of any of Examples 160 to 169, the extended control PHY header to comprise an information element indicating a number of receive training sectors.

Example 171 is the apparatus of Example 156, comprising means for identifying the feedback order based on a received multi-cast packet indicating an order for responses to the multi-link beamforming training packet.

Example 172 is the apparatus of Example 171, the multi-cast packet to indicate a start time for the multi-link beamforming training packet.

Example 173 is the apparatus of any of Examples 171 to 172, the multi-cast packet to be received via a 2.4 GHz frequency band or a 5 GHz frequency band, the multi-link beamforming training packet to be received via a 60 GHz band.

Example 174 is the apparatus of any of Examples 171 to 173, the beamforming training feedback to be transmitted to the remote device via a 2.4 GHz frequency band.

Example 175 is the apparatus of any of Examples 156 to 174, the wireless link to comprise a 60 GHz frequency band wireless link.

Example 176 is the apparatus of any of Examples 156 to 175, the remote device to comprise a personal basic service set control point/access point (PCP/AP).

Example 177 is the apparatus of any of Examples 156 to 176, the wireless communication device to comprise a directional multi-gigabit (DMG) station (STA).

Example 178 is a system, comprising an apparatus according to any of Examples 156 to 177, and at least one radio frequency (RF) transceiver.

Example 179 is the system of Example 178, comprising at least one processor.

Example 180 is the system of any of Examples 178 to 179, comprising at least one RF antenna.

Example 181 is the system of any of Examples 178 to 180, comprising a touchscreen display.

Example 182 is an apparatus, comprising means for identifying, at a wireless communication device, a plurality of links to be trained via a multi-link beamforming training procedure, each of the plurality of links to comprise a wireless link with a respective one of a plurality of remote devices, means for generating a multi-link beamforming training packet for transmission during the multi-link beamforming training procedure, and means for processing beamforming training feedback received in response to the multi-link beamforming training packet according to a feedback order for the multi-link beamforming training packet.

Example 183 is the apparatus of Example 182, the multi-link beamforming training packet to contain a header sequence comprising a plurality of headers, the header sequence to indicate the feedback order.

Example 184 is the apparatus of Example 183, an order of the plurality of headers within the header sequence to indicate the feedback order.

Example 185 is the apparatus of any of Examples 183 to 184, each of the plurality of headers to comprise an association identifier (AID) for a respective one of the plurality of remote devices.

Example 186 is the apparatus of any of Examples 183 to 185, the multi-link beamforming training packet to comprise an extended control physical layer (PHY) header.

Example 187 is the apparatus of Example 186, the extended control PHY header to comprise a multi-link beamforming training packet type indicator.

Example 188 is the apparatus of any of Examples 186 to 187, the extended control PHY header to comprise an information element indicating a number of preambles comprised in a preamble sequence of the multi-link beamforming training packet.

Example 189 is the apparatus of Example 188, each preamble of the preamble sequence to be transmitted in a different direction.

Example 190 is the apparatus of Example 189, the header sequence to comprise a respective corresponding header for each preamble of the preamble sequence.

Example 191 is the apparatus of any of Examples 189 to 190, each preamble of the preamble sequence to comprise a short training field (STF) and a channel estimation (CE) field.

Example 192 is the apparatus of Example 191, each STF to comprise a shortened STF.

Example 193 is the apparatus of any of Examples 189 to 192, each preamble of the preamble sequence to comprise a sync sequence to indicate an order of that preamble in the preamble sequence.

Example 194 is the apparatus of any of Examples 189 to 193, the preamble sequence to precede the header sequence within the multi-link beamforming training packet.

Example 195 is the apparatus of any of Examples 189 to 193, the preamble sequence interleaved with the header sequence within the multi-link beamforming training packet.

Example 196 is the apparatus of any of Examples 186 to 195, the extended control PHY header to comprise an information element indicating a number of transmit training sectors.

Example 197 is the apparatus of any of Examples 186 to 196, the extended control PHY header to comprise an information element indicating a number of receive training sectors.

Example 198 is the apparatus of Example 182, comprising means for generating a multi-cast packet for transmission to the plurality of remote devices, the multi-cast packet to indicate the feedback order.

Example 199 is the apparatus of Example 198, the multi-cast packet to indicate a start time for the multi-link beamforming training packet.

Example 200 is the apparatus of any of Examples 198 to 199, the multi-cast packet to be transmitted via a 2.4 GHz frequency band or a 5 GHz frequency band, the multi-link beamforming training packet to be transmitted via a 60 GHz band.

Example 201 is the apparatus of Example 200, the beamforming training feedback to be received via a 2.4 GHz frequency band.

Example 202 is the apparatus of any of Examples 182 to 201, the plurality of wireless links to comprise 60 GHz frequency band wireless links.

Example 203 is the apparatus of any of Examples 182 to 202, the wireless communication device to comprise a personal basic service set control point/access point (PCP/AP).

Example 204 is the apparatus of any of Examples 182 to 203, the plurality of remote devices to comprise directional multi-gigabit (DMG) stations (STAs).

Example 205 is a system, comprising an apparatus according to any of Examples 182 to 204, and at least one radio frequency (RF) transceiver.

Example 206 is the system of Example 205, comprising at least one processor.

Example 207 is the system of any of Examples 205 to 206, comprising at least one RF antenna.

Example 208 is the system of any of Examples 205 to 207, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory; and
logic for a wireless communication device, at least a portion of the logic comprised in circuitry coupled to the memory, the logic to:
identify a feedback order for a multi-link beamforming training packet, the multi-link beamforming training packet to comprise an extended control physical layer (PHY) header containing an information element to indicate a number of preambles comprised in a preamble sequence of the multi-link beamforming training packet;
determine a feedback transmission time for the wireless communication device based on the feedback order;
train a wireless link with a remote device based on one or more training fields comprised in the multi-link beamforming training packet; and
generate beamforming training feedback for transmission to the remote device at the feedback transmission time.

2. The apparatus of claim 1, the multi-link beamforming training packet to comprise the preamble sequence and a header sequence, the header sequence to comprise a respective corresponding header for each preamble of the preamble sequence.

3. The apparatus of claim 2, the logic to determine the feedback order based on an order of a plurality of headers comprised in the header sequence.

4. The apparatus of claim 2, the preamble sequence to precede the header sequence within the multi-link beamforming training packet.

5. The apparatus of claim 2, the preamble sequence interleaved with the header sequence within the multi-link beamforming training packet.

6. A system, comprising:
the apparatus of claim 1; and
at least one radio frequency (RF) transceiver.

7. An apparatus, comprising:
a memory; and
logic for a wireless communication device, at least a portion of the logic comprised in circuitry coupled to the memory, the logic to:
identify a plurality of links to be trained via a multi-link beamforming training procedure, each of the plurality of links to comprise a wireless link with a respective one of a plurality of remote devices;
generate a multi-link beamforming training packet for transmission during the multi-link beamforming training procedure, the multi-link beamforming training packet to comprise an extended control physical layer (PHY) header containing an information element to indicate a number of preambles comprised in a preamble sequence of the multi-link beamforming training packet; and
process beamforming training feedback received in response to the multi-link beamforming training packet according to a feedback order for the multi-link beamforming training packet.

8. The apparatus of claim 7, the multi-link beamforming training packet to comprise the preamble sequence and a header sequence, the header sequence to comprise a respective corresponding header for each preamble of the preamble sequence.

9. The apparatus of claim 8, an order of a plurality of headers within the header sequence to indicate the feedback order.

10. The apparatus of claim 8, the preamble sequence to precede the header sequence within the multi-link beamforming training packet.

11. The apparatus of claim 8, the preamble sequence interleaved with the header sequence within the multi-link beamforming training packet.

12. At least one non-transitory computer-readable storage medium comprising a set of instructions that, in response to being executed at a wireless communication device, cause the wireless communication device to:
identify a feedback order for a multi-link beamforming training packet, the multi-link beamforming training packet to comprise an extended control physical layer (PHY) header containing an information element to indicate a number of preambles comprised in a preamble sequence of the multi-link beamforming training packet;
determine a feedback transmission time for the wireless communication device based on the feedback order;
train a wireless link with a remote device based on one or more training fields comprised in the multi-link beamforming training packet; and
generate beamforming training feedback for transmission to the remote device at the feedback transmission time.

13. The at least one non-transitory computer-readable storage medium of claim 12, the multi-link beamforming training packet to comprise the preamble sequence and a header sequence, the header sequence to comprise a respective corresponding header for each preamble of the preamble sequence.

14. The at least one non-transitory computer-readable storage medium of claim 13, comprising instructions that, in response to being executed on the computing device, cause the computing device to determine the feedback order based on an order of a plurality of headers comprised in the header sequence.

15. The at least one non-transitory computer-readable storage medium of claim 13, the preamble sequence to precede the header sequence within the multi-link beamforming training packet.

16. The at least one non-transitory computer-readable storage medium of claim 13, the preamble sequence interleaved with the header sequence within the multi-link beamforming training packet.

17. At least one non-transitory computer-readable storage medium comprising a set of instructions that, in response to being executed at a wireless communication device, cause the wireless communication device to:
identify a plurality of links to be trained via a multi-link beamforming training procedure, each of the plurality of links to comprise a wireless link with a respective one of a plurality of remote devices;
generate a multi-link beamforming training packet for transmission during the multi-link beamforming training procedure, the multi-link beamforming training packet to comprise an extended control physical layer (PHY) header containing an information element to indicate a number of preambles comprised in a preamble sequence of the multi-link beamforming training packet; and process beamforming training feedback received in response to the multi-link beamforming training packet according to a feedback order for the multi-link beamforming training packet.

18. The at least one non-transitory computer-readable storage medium of claim 17, the multi-link beamforming training packet to comprise the preamble sequence and a header sequence, the header sequence to comprise a respective corresponding header for each preamble of the preamble sequence.

19. The at least one non-transitory computer-readable storage medium of claim 18, an order of a plurality of headers within the header sequence to indicate the feedback order.

20. The at least one non-transitory computer-readable storage medium of claim 18, the preamble sequence to precede the header sequence within the multi-link beamforming training packet.

21. The at least one non-transitory computer-readable storage medium of claim 18, the preamble sequence interleaved with the header sequence within the multi-link beamforming training packet.

\* \* \* \* \*